(12) United States Patent
Yoo

(10) Patent No.: US 9,998,900 B1
(45) Date of Patent: Jun. 12, 2018

(54) BACKPACK-TYPE MOBILE BASE STATION SYSTEM AND METHOD BASED ON TVWS AND SATELLITE BACKHAUL

(71) Applicant: INNONET CO., LTD., Seongnam-si, Gyeonggi-do (KR)

(72) Inventor: Ho Sang Yoo, Seoul (KR)

(73) Assignee: INNONET CO., LTD., Seongnam-si, Gyeonggi-do (KR)

( * ) Notice: Subject to any disclaimer, the term of this patent is extended or adjusted under 35 U.S.C. 154(b) by 0 days. days.

(21) Appl. No.: 15/577,686

(22) PCT Filed: Jul. 14, 2016

(86) PCT No.: PCT/KR2016/007696
§ 371 (c)(1),
(2) Date: Nov. 28, 2017

(87) PCT Pub. No.: WO2017/010831
PCT Pub. Date: Jan. 19, 2017

(30) Foreign Application Priority Data

Jul. 16, 2015 (KR) .......................... 10-2015-0100876

(51) Int. Cl.
*H04M 11/04* (2006.01)
*H04B 7/185* (2006.01)
(Continued)

(52) U.S. Cl.
CPC ............ *H04W 4/90* (2018.02); *H04B 7/0404* (2013.01); *H04B 7/15592* (2013.01); *H04B 7/1851* (2013.01)

(58) Field of Classification Search
None
See application file for complete search history.

(56) References Cited

U.S. PATENT DOCUMENTS

2015/0045032 A1* 2/2015 Tomici ................. H04W 36/04
455/436

FOREIGN PATENT DOCUMENTS

KR    10-2012-0054651 A    5/2012
KR    10-2013-0071325 A    6/2013
(Continued)

OTHER PUBLICATIONS

Sidney, Roberts et al.: "Connecting Africa Using the TV White Spaces: From Research to Real World Deployments", TBE 21st IEEE International Workshop on Local and Metropolitan Area Networks, Apr. 22, 2015, pp. 1-6.

*Primary Examiner* — Erika Washington
(74) *Attorney, Agent, or Firm* — Novick, Kim & Lee, PLLC; Sang Ho Lee

(57) ABSTRACT

Provided herein is a backpack-type mobile base station system based on a TVWS and satellite backhaul, including a mobile base station configured to wirelessly perform matching with any one of a backhaul donor and a backhaul bridge through a TVWS, and provide an emergency disaster mobile communication service to a terminal. The mobile base station may include: a backhaul wireless matching unit configured to wirelessly perform matching with any one of the backhaul donor and the backhaul bridge through the TVWS; a terminal wireless matching unit configured to wirelessly perform matching with the terminal; and a base station signal processing unit configured to process a signal of the mobile base station between the backhaul wireless matching unit and the terminal wireless matching unit. The backhaul donor, the backhaul bridge and the mobile base station may receive power from any one of a commercial power supply, a battery, sunlight, wind power, and a power generator.

17 Claims, 13 Drawing Sheets

(51) Int. Cl.
*H04B 7/0404* (2017.01)
*H04B 7/155* (2006.01)

(56) References Cited

FOREIGN PATENT DOCUMENTS

| | | |
|---|---|---|
| KR | 10-2013-0117881 A | 10/2013 |
| KR | 10-2014-0004548 A | 1/2014 |
| KR | 10-2014-0136512 A | 11/2014 |

\* cited by examiner

BACKPACK-TYPE MOBILE BASE STATION SYSTEM AND METHOD BASED ON TVWS AND SATELLITE BACKHAUL

TECHNICAL FIELD

Exemplary embodiments of the present invention relate to a backpack-type mobile base station system and method based on a TVWS (Television White Space) and satellite backhaul, and more particularly, to a backpack-type mobile base station system and method for performing a disaster safety mobile communication service using a TVWS as a backhaul. That is, exemplary embodiments of the present invention relate to a backpack-type mobile base station system and method based on a TVWS and satellite backhaul, which allows a mobile base station to communicate with a maintenance server through a backhaul, the mobile base station performing a disaster safety mobile communication.

BACKGROUND ART

The loss of lives caused by disasters in Korea has shown a gradual decrease since 1990s, but still maintains a higher level than developed countries, and thus brings about social costs.

Although the loss of lives caused by disasters has decreased, an additional national disaster network business is required at home and abroad because disasters become bigger and more concentrated while new disasters occur.

Moreover, the national disaster network requires a mobile base station which can be used for removing small-scale radio shadow areas, preventing heavy network traffic of an emergency disaster area, and recovering an emergency disaster safety network of an area where a vehicle access is not allowed due to a collapse of the safety disaster network and a broken road.

For example, Korean Patent Registration No. 1355109 discloses a method in which at least one macro base station allocates a wireless backhaul resource to a plurality of distributed small base stations, and allocates an additional resource in case of a sudden increase of traffic, such that the limited wireless backhaul resource between the macro base station and the distributed small base stations can be efficiently used. Thus, the method can provide a high-quality mobile communication service to mobile communication terminals.

However, since the backhaul used as small base station by the macro base station occupies a large transmission capacity, a microwave (M/V) link or satellite must be used.

Furthermore, when the M/V link is used, visibility must be secured, and when the satellite is used, the use is limited in a building.

Most of existing mobile communication base stations have been used for vehicles, and optical communications (wired), M/W links and satellites have been used as backhauls.

When the optical backhaul is used, the optical backhaul cannot be quickly installed and removed. Furthermore, since the M/W backhaul has a high linearity, the M/W backhaul must be operated in an LOS (Line Of Sight) environment, and a tower must be installed.

The satellite backhaul can be installed anywhere, but is expensive and has a speed of less than 3 Mbps, which means that the speed is not so high. However, a satellite having a speed of 3 Mbps needs to be connected in a desert or remote area in the mountains.

Related Art Document: Korean Registration No. 1355109 registered on Jan. 17, 2014

DISCLOSURE

Technical Problem

The present invention has been made in view of the above problems, and it is an object of the present invention to provide a backpack-type mobile base station system and method based on a TVWS and satellite backhaul, which is capable of providing a disaster safety mobile communication service using a TVWS as a backhaul.

Also, it is another object of the present invention to provide a backpack-type mobile base station system and method based on a TVWS and satellite backhaul, in which a mobile base station providing a disaster safety mobile communication service can be easily carried and constructed because the mobile base station communicates with a maintenance server using a TVWS as a backhaul. Thus, the backpack-type mobile base station system and method based on a TVWS and satellite backhaul can remove a small-scale shadow area, lower a traffic overload in an emergency disaster area, and allow a disaster recovery worker to recover an emergency disaster safety network in an area where a vehicle access is not allowed due to a broken road or the like.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a backpack-type mobile base station system based on a TVWS and satellite backhaul, including a mobile base station configured to wirelessly perform matching with any one of a backhaul donor and a backhaul bridge through a TVWS, and provide an emergency disaster mobile communication service to a terminal. The mobile base station may include: a backhaul wireless matching unit configured to wirelessly perform matching with any one of the backhaul donor and the backhaul bridge through the TVWS; a terminal wireless matching unit configured to wirelessly perform matching with the terminal; and a base station signal processing unit configured to process a signal of the mobile base station between the backhaul wireless matching unit and the terminal wireless matching unit. The backhaul donor, the backhaul bridge and the mobile base station may receive power from any one of a commercial power supply, a battery, sunlight, wind power, and a power generator.

The backhaul wireless matching unit may include: a TVWS modem unit configured to modulate and demodulate a signal of the base station signal processing unit; and a TVWS transmitting/receiving unit configured to convert a signal of the TVWS modem unit into a TVWS frequency signal or reversely convert the TVWS frequency signal, and wirelessly transmit/receive the TVWS frequency signal to/from any one of the backhaul donor and the backhaul bridge.

The terminal wireless matching unit may include: a mobile communication modem unit configured to modulate and demodulate a signal of the base station signal processing unit; and a mobile communication RF transmitting/receiving unit configured to convert a signal of the mobile communication modem unit into an RF frequency signal or reversely convert the RF frequency signal, and wirelessly transmit/receive the RF frequency signal to/from the terminal.

The base station signal processing unit may include one or more: a base station switch unit configured to switch signals of the backhaul wireless matching unit and the terminal wireless matching unit; a satellite transmitting/receiving unit configured to wirelessly transmit/receive a signal to/from the satellite; a power supply unit configured to supply power to the mobile base station; and a wireless LAN matching unit configured to match a wireless LAN signal.

The backhaul donor may include: a donor signal processing unit connected to a disaster safety mobile communication server through a WAN, and configured to process a signal of the backhaul donor; and a service backhaul wireless matching unit connected to the donor signal processing unit, and configured to wirelessly perform matching with any one of the mobile base station and the backhaul bridge through a TVWS.

The service backhaul wireless matching unit may include: a TVWS modem unit configured to modulate and demodulate a signal of the donor signal processing unit; and a TVWS transmitting/receiving unit configured to convert a signal of the TVWS modem unit into a TVWS frequency signal or reversely convert the TVWS frequency signal, and wirelessly transmit/receive the TVWS frequency signal to/from any one of the mobile base station and the backhaul bridge.

The donor signal processing unit may include one or more: a WAN matching unit configured to perform matching with the disaster safety mobile communication server through the WAN; a donor switch unit configured to switch signals of the WAN matching unit and the service backhaul wireless matching unit; a satellite transmitting/receiving unit configured to wirelessly transmit/receive a signal to/from the satellite; a power supply unit configured to supply power to the backhaul donor; and a wireless LAN matching unit configured to match a wireless LAN signal.

The backhaul bridge may include: a first backhaul wireless matching unit configured to wirelessly perform matching with the backhaul donor through a TVWS; a second backhaul wireless matching unit configured to wirelessly perform matching with the mobile base station through a TVWS; and a bridge signal processing unit configured to process a signal of the backhaul bridge between the first and second backhaul wireless matching units.

The first backhaul wireless matching unit may include: a TVWS modem unit configured to modulate and demodulate a signal of the bridge signal processing unit into a baseband signal; and a TVWS transmitting/receiving unit configured to convert a signal of the TVWS modem unit into a TVWS frequency signal or reversely convert the TVWS frequency signal, and wirelessly transmit/receive the TVWS frequency signal to/from the backhaul donor.

The second backhaul wireless matching unit may include: a TVWS modem unit configured to modulate and demodulate a signal of the bridge signal processing unit; and a TVWS transmitting/receiving unit configured to convert a signal of the TVWS modem unit into a TVWS frequency signal or reversely convert the TVWS frequency signal, and wirelessly transmit/receive the TVWS frequency signal to/from the mobile base station.

One or more backhaul bridges may be successively used to connect the backhaul donor and the mobile base station.

The bridge signal processing unit may include: a bridge switch unit configured to switch signals of the first and second backhaul wireless matching unit; a satellite transmitting/receiving unit configured to wirelessly transmit/receive a signal to/from the satellite; a power supply unit configured to supply power to the backhaul bridge; and a wireless LAN matching unit configured to match a wireless LAN signal.

The backhaul donor, the backhaul bridge and the mobile base station may include a structure which is carried through a backpack.

The backhaul donor, the backhaul bridge and the mobile base station may include a MIMO system to raise the transmission rate of a wireless backhaul.

The MIMO system may separately use vertically and horizontally polarized waves within a range of sight, and change the angle of an omni-directional antenna by 90 degrees in order to use the antenna.

The disaster safety mobile communication server may include a security gateway for solving a security problem on a network.

In accordance with another aspect of the present invention, a backpack-type mobile base station method based on a TVWS and satellite backhaul may include: a backhaul wireless matching step of wirelessly performing matching with any one of a backhaul donor and a backhaul bridge through a TVWS; a base station signal processing step of processing an output of the backhaul wireless matching step into a signal for performing matching with a terminal; and a terminal wireless matching step of wirelessly performing matching with the terminal. In the backhaul wireless matching step, the backhaul donor and the backhaul bridge may receive power from at least one of a commercial power supply, a battery, sunlight, wind power and a power generator.

In addition, other features and advantages of the present invention may be newly recognized through the following embodiments.

Advantageous Effects

The backpack-type mobile base station system and method based on a TVWS and satellite backhaul can provide a disaster safety mobile communication service using a TVWS as a backhaul.

Furthermore, in the backpack-type mobile base station system and method based on a TVWS and satellite backhaul, the mobile base station providing a disaster safety mobile communication service can be easily carried and constructed because the mobile base station communicates with a maintenance server using a TVWS as a backhaul. Thus, the mobile base station providing a disaster safety mobile communication service can remove a small-scale shadow area in a national disaster safety network, lower a traffic overload in an emergency disaster area, and allow a disaster recovery worker to recover an emergency disaster safety network in an area where a vehicle access is not allowed due to a broken road or the like.

The effects acquired in the present invention are not limited to the above-described effects, but other effects which are not described herein can be clearly understood by those skilled in the art to which the present invention pertains, from the following descriptions.

BEST MODE FOR INVENTION

Figure 1:
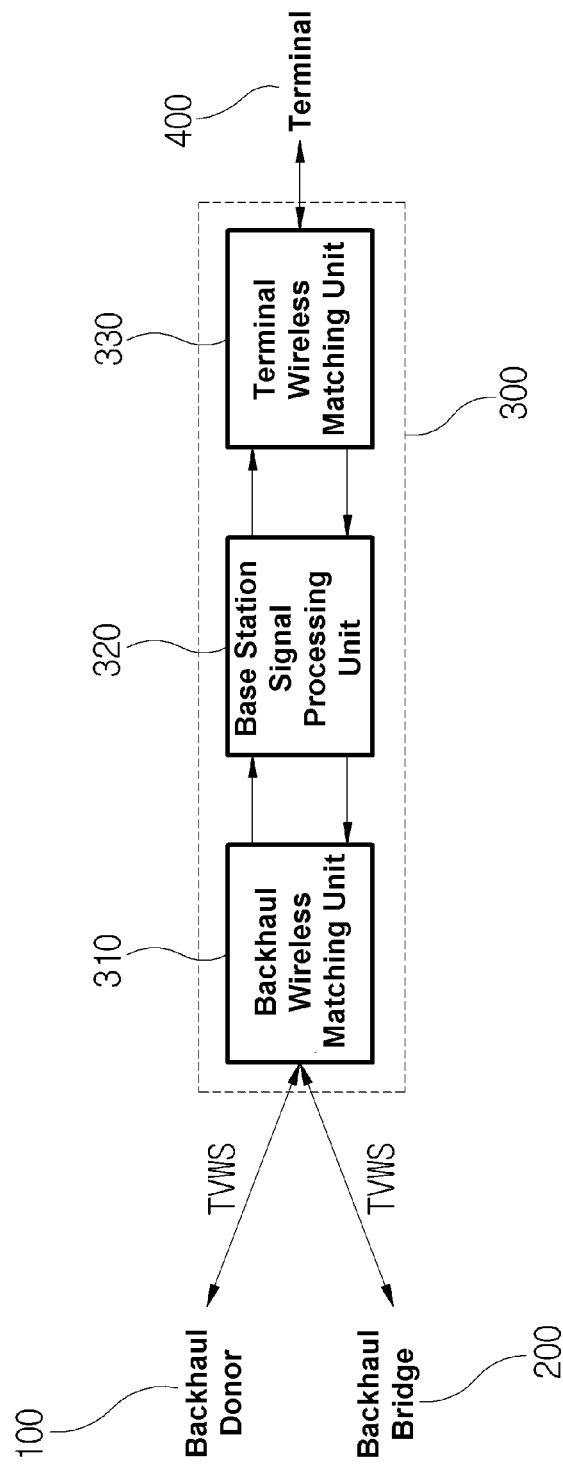
FIG. 1 is a configuration diagram illustrating a backpack-type mobile base station system based on a TVWS and satellite backhaul according to an embodiment of the present invention.

Hereafter, exemplary embodiments of the present invention will be described in detail with reference to the accompanying drawings, such that they can easily be carried out by a person with ordinary skill in the art to which the present invention pertains. The present invention can be embodied in various forms, and is not limited to the embodiments.

In order to clearly describe the present invention, elements which are not related to the descriptions are omitted. Throughout the specification, the same or similar elements will be represented by like reference numerals.

Throughout the specification, when one element is referred to as being "connected to" another element, it may not only indicate that the former element is "directly connected to" the latter element, but also indicate that the former element is "electrically connected to" the latter element with another element interposed therebetween. Furthermore, when an element "includes" a component, it may indicate that the element does not exclude another component unless referred to the contrary, but can further include another component.

The technical terms used herein are used only to describe a specific embodiment, but not limit the present invention. The terms of a singular form may include plural forms unless referred to the contrary. The meaning of the term "including" used in the specification specifies a specific characteristic, region, integer, step, operation, element and/or component, and not exclude a presence or addition of another characteristic, region, integer, step, operation, element and/or component.

The terms including technical or scientific terms have the same meanings as the terms which are generally understood by those skilled in the art to which the present invention pertains, as long as they are differently defined. The terms defined in a generally used dictionary may be additionally analyzed to have meanings which coincide with contextual meanings in the related art documents. As long as the terms are not clearly defined in this specification, the terms may not be analyzed as ideal or excessively formal meanings.

Hereafter, a backpack-type mobile base station system and method based on a TVWS and satellite backhaul according to an embodiment of the present invention will described with reference to the accompanying drawings.

FIG. 1 is a configuration diagram illustrating a backpack-type mobile base station system based on a TVWS and satellite backhaul according to an embodiment of the present invention, and FIGS. 2 to 12 are configuration and connection diagrams for describing FIG. 1 in detail.

Hereafter, the backpack-type mobile base station system based on a TVWS and satellite backhaul according to the embodiment of the present invention will be described with reference to FIGS. 1 to 12.

Referring to FIG. 1, the backpack-type mobile base station system based on a TVWS and satellite backhaul according to the embodiment of the present invention includes a backhaul donor 100, a backhaul bridge 200 and a mobile base station 300.

The mobile base station 300 wirelessly performs matching with any one of the backhaul donor 100 and the backhaul bridge 200 through a TVWS. Through this operation, the mobile base station 300 provides an emergency disaster mobile communication service to a terminal 400.

The mobile base station 300 includes a backhaul wireless matching unit 310, a base station signal processing unit 320 and a terminal wireless matching unit 330. The backhaul wireless matching unit 310 wirelessly performs matching with any one of the backhaul donor 100 and the backhaul bridge 200 through a TVWS. The terminal wireless matching unit 330 wirelessly performs matching with the terminal 400. The base station signal processing unit 320 processes a signal of the mobile base station 300 between the backhaul wireless matching unit 310 and the terminal wireless matching unit 330.

The mobile base station 300 may be connected to a TCP/IP (Transmission Control Protocol/Internet Protocol) network through satellite and RF (Radio Frequency) backhauls, while transmitting/receiving signals to/from the terminal through PS-LTE (Public Safety—Long Term Evolution) in the 700 MHz band. The mobile base station 300 may have a battery embedded therein, and receive power from an independent power supply (sunlight, wind power or power generator) besides a commercial power supply (for example, AC 200V).

The terminal wireless matching unit 330 may receive RF signals through two PS-LTE antennas, the RF signals being transmitted by the terminal 400 through a PS-LTE MIMO (Multi Input Multi Output) system. The received PS-LTE MIMO RF signals are converted into baseband signals through OFDM (Orthogonal Frequency Division Multiplexing) demodulation. The demodulated signals may be converted into packet data which can be transmitted to the TCP/IP network, and inputted to the base station signal processing unit 320.

The packet data may be connected to an RF backhaul or satellite depending on the backhaul connection state. When the packet data are to be transmitted to the RF backhaul, the packet data may be inputted to the backhaul wireless matching unit 310, and modulated to TVWS MIMO OFDM signals in the 6 MHz band. At this time, the MIMO system may separately use vertically and horizontally polarized waves in the TVWS band.

The modulated TVWS MIMO signals may be converted into signals in the 470-698 MHz band, and then radiated to the backhaul donor 100 or the backhaul bridge 200 through two TVWS antennas.

TVWS represents a band which is not used by TV channels, in the 470-698 MHz band. Since a disaster safety mobile communication server 500 illustrated in FIG. 7 has a low frequency band, the refractive index is high, and signals can propagate further away. Furthermore, since the TVWS has a low frequency band, signals can easily propagate in a NLOS (Non-Line-Of-Sight) environment as well as a LOS (Line-Of-Sight) environment.

When the TVWS is used, a wireless network can be constructed at low cost in an ISM (Industrial Scientific Medical) band. Furthermore, ISM bands of 2.4 GHz and 5 GHz allows a remote service of 10 km or more, using a high gain antenna of 20 dBi or more in a 1:1 (point-to-point) configuration. On the other hand, the TVWS can be used as an ISM band up to an EIRP (Effective Isotropic Radiated Power) of 36 dBm, and thus allow a remote service of 10 km or more in a 1:N (point-to-multi-point) configuration.

Moreover, since the TVWS uses a channel which is not used by TV channels in the 470-698 MHz band, ultra high-speed wireless data transmission can be achieved through the TVWS. Furthermore, since the M/W (Microwave) has a high frequency, the M/W has difficulties in transmitting data through trees. On the other hand, since the TVWS has a low frequency, signals can easily pass through trees. Thus, although antennas are installed at low positions, the system can be normally operated.

When TVWS devices are successively connected through a master/slave structure, the TVWS backhaul distance can be expanded. In other words, since the TVWS device can transmit a signal up to 10 km or more at one hop, a plurality of master/slave devices may be connected to provide a communication service to terminals several tens of km or more away.

Such a structure can be connected through the backhaul donor 10 (connected to the WAN)—the TVWS section—the backhaul bridge 200—the TVWS section—the mobile base station 300. At this time, the backhaul bridge 200 may include slave and mater devices connected to each other through a LAN port, and the mobile base station 300 may include a slave device and a PS-LET modem/RF. Therefore, the master and slave devices may be used to achieve the 1:N configuration.

Figure 2:
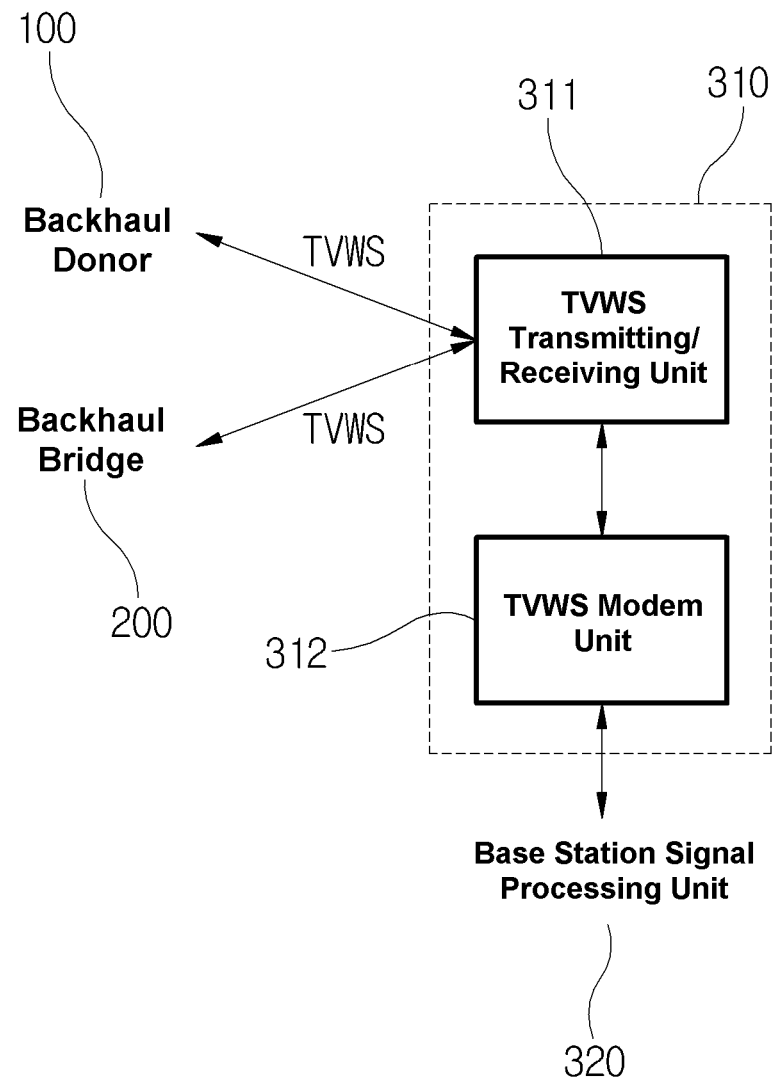
FIG. 2 is a configuration diagram illustrating a backhaul wireless matching unit of FIG. 1 in detail.

FIG. 2 is a configuration diagram illustrating the backhaul wireless matching unit 310 of FIG. 1 in detail.

Referring to FIG. 2, the backhaul wireless matching unit 310 includes a TVWS transmitting/receiving unit 311 and a TVWS modem unit 312.

The TVWS transmitting/receiving unit 311 converts a signal of the TVWS modem unit 312 into a TVWS frequency signal or reversely converts a TVWS frequency signal, and wirelessly transmits/receives a signal to/from any one of the backhaul donor 100 and the backhaul bridge 200. The TVWS modem unit 312 modulates and demodulates a signal of the base station signal processing unit 320. That is, TVWS MIMO RF signals transmitted from the backhaul donor 100 and the backhaul bridge 200 may be received through two TVWS antennas of the TVWS transmitting/receiving unit 311. The received TVWS MIMO RF signals are demodulated into baseband signals by the TVWS modem unit 312. The demodulated signals may be converted into TCP/IP packet data, and inputted to the base station signal processing unit 320.

The TVWS modem unit 312 may OFDM-demodulate an analog I/Q signal, convert the demodulated signal into TCP/IP packet data, and transmit the TCP/IP packet data to the base station signal processing unit 320.

Furthermore, the TVWS modem unit 312 may OFDM-modulate TCP/IP packet data transmitted from the base station signal processing unit 320, and convert the modulated data into an analog I/Q signal. Then, the TVWS modem unit 312 may transmit the analog I/Q signal to the backhaul donor 100 or the backhaul bridge 200 through the TVWS transmitting/receiving unit 311.

The TVWS transmitting/receiving unit 311 may include a low noise amplifier (LNA) for low-noise amplifying TVWS MIMO RF signals and a high power amplifier (HPA) for amplifying TVWS MIMO RF signals to high power. The TVWS transmitting/receiving unit 311 may include an RF switch for switching between operations of transmitting and receiving an RF signal.

Figure 3:
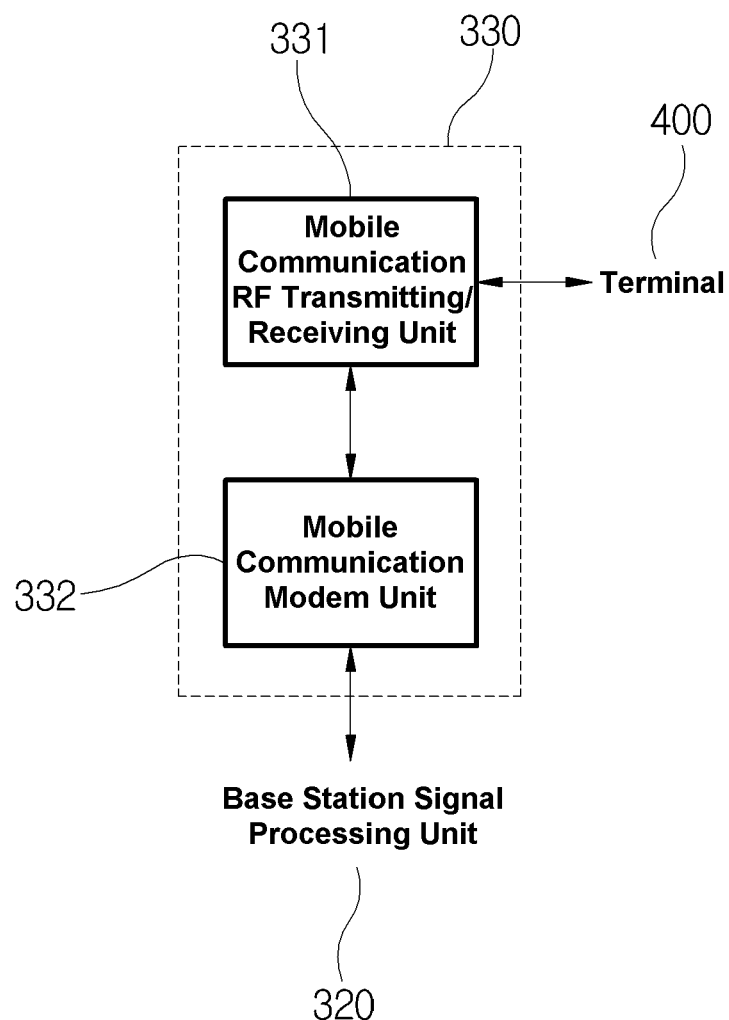
FIG. 3 is a configuration diagram illustrating a terminal wireless matching unit of FIG. 1 in detail.

FIG. 3 is a configuration diagram illustrating the terminal wireless matching unit 330 of FIG. 1 in detail.

Referring to FIG. 3, the terminal wireless matching unit 330 includes a mobile communication RF transmitting/receiving unit 331 and a mobile communication modem unit 332.

The mobile communication RF transmitting/receiving unit 331 converts a signal of the mobile communication modem unit 332 into a mobile communication RF frequency signal or reversely converts a mobile communication RF frequency signal, and wirelessly transmits/receives a signal to/from the terminal 400. The mobile communication modem unit 332 modulates and demodulates a signal of the base station signal processing unit 320. PS-LTE signals transmitted from the terminal 400 may be received through two antennas of the mobile communication RF transmitting/receiving unit 331. The received PS-LTE MIMO signals are demodulated into baseband signals by the mobile communication modem unit 332. The demodulated signals may be converted into TCP/IP packet data, and the TCP/IP packet data may be inputted to the base station signal processing unit 320.

At this time, the mobile communication modem unit 332 OFDM-demodulates an analog I/Q signal, and converts an analog I/Q signal into TCP/IP packet data. Then, the mobile communication modem unit 332 may transmit the TCP/IP packet data to the base station signal processing unit 320.

Furthermore, the mobile communication modem unit 332 OFDM-modulates TCP/IP packet data transmitted from the base station signal processing unit 320, and converts the modulated data into an analog I/Q signal. Then, the mobile communication modem unit 332 may transmit the analog I/Q signal to the terminal 400 through the mobile communication RF transmitting/receiving unit 331.

The mobile communication RF transmitting/receiving unit 331 may include an LNA for low-noise amplifying a PS-LTE signal and an HPA for amplifying a PS-LTE MIMO signal to high power. The mobile communication RF transmitting/receiving unit 331 may further include an RF switch for switching between operations of transmitting and receiving an RF signal.

Figure 4:
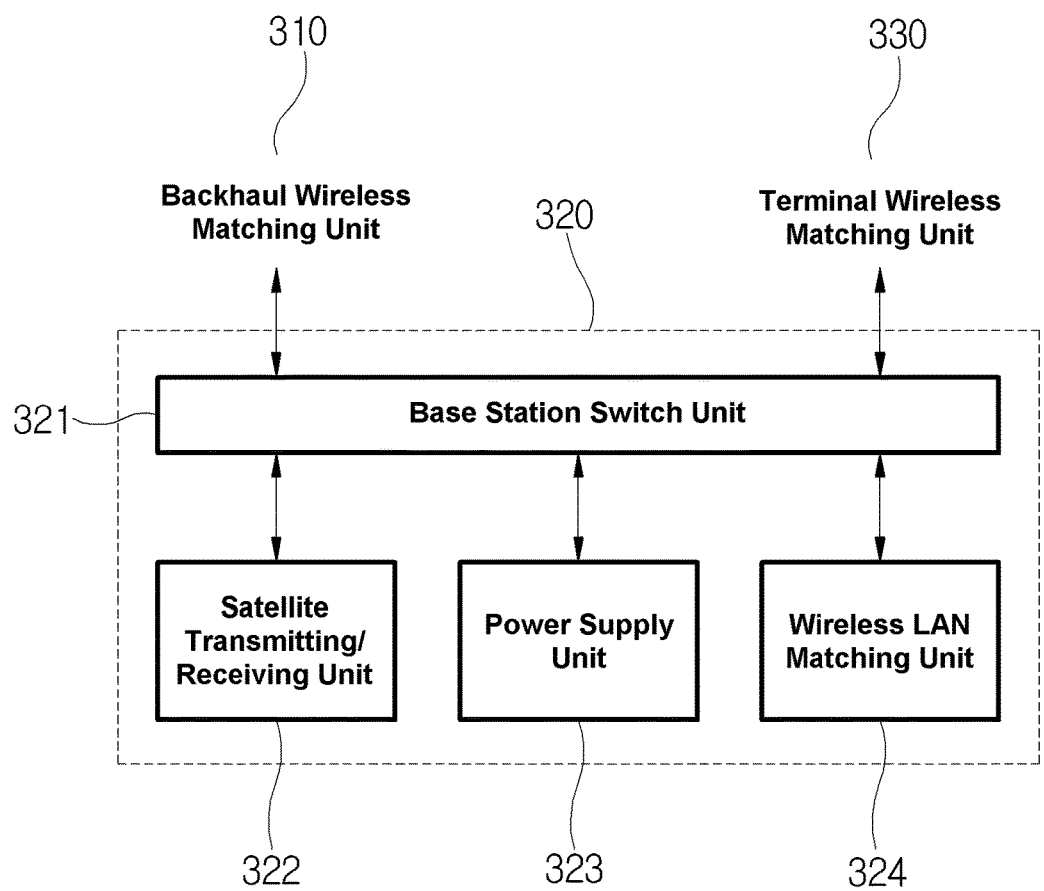
FIG. 4 is a configuration diagram illustrating a base station signal processing unit of FIG. 1 in detail.

FIG. 4 is a configuration diagram illustrating the base station signal processing unit 320 of FIG. 1 in detail.

Referring to FIG. 4, the base station signal processing unit 320 includes one or more of a base station switch unit 321, a satellite transmitting/receiving unit 322, a power supply unit 323 and a wireless LAN matching unit 324.

The base station switch unit 321 switches signals of the backhaul wireless matching unit 310 and the terminal wireless matching unit 330. The satellite transmitting/receiving unit 322 wirelessly transmits/receives a signal to/from a satellite. The power supply unit 323 supplies power to the mobile base station 300. The wireless LAN matching unit 324 matches a wireless LAN signal.

For example, a signal received from the terminal wireless matching unit 330 and a wireless LAN signal received from the wireless LAN matching unit 324 may be inputted to the base station switch unit 321, and transmitted to the satellite through the satellite transmitting/receiving unit 322 according to the backhaul setting.

For another example, a signal received from the terminal wireless matching unit 330 and a wireless LAN signal received from the wireless LAN matching unit 324 may be transmitted to the backhaul donor 100 or the backhaul bridge 200 through the backhaul wireless matching unit 310.

Furthermore, a signal transmitted from the backhaul wireless matching unit 310 or the satellite transmitting/receiving unit 322 may be retransmitted to the terminal wireless matching unit 330. Also, the signal transmitted from the backhaul wireless matching unit 310 or the satellite transmitting/receiving unit 322 may be retransmitted to the wireless LAN matching unit 324.

The satellite transmitting/receiving unit 322 may be used for acquiring location information of the mobile base station 300, and the location information may be acquired through a GPS (Global Positioning System) antenna and receiver. The power supply unit 323 may include a commercial power supply (AC 200V) and an independent power supply unit, and can be charged by a battery. The base station switch unit 321 may include a user interface, and an LCD (Liquid Crystal Display) and a key pad may be applied as the user interface. Through the user interface, the state of the mobile base station 300 may be monitored and controlled.

Figure 5:
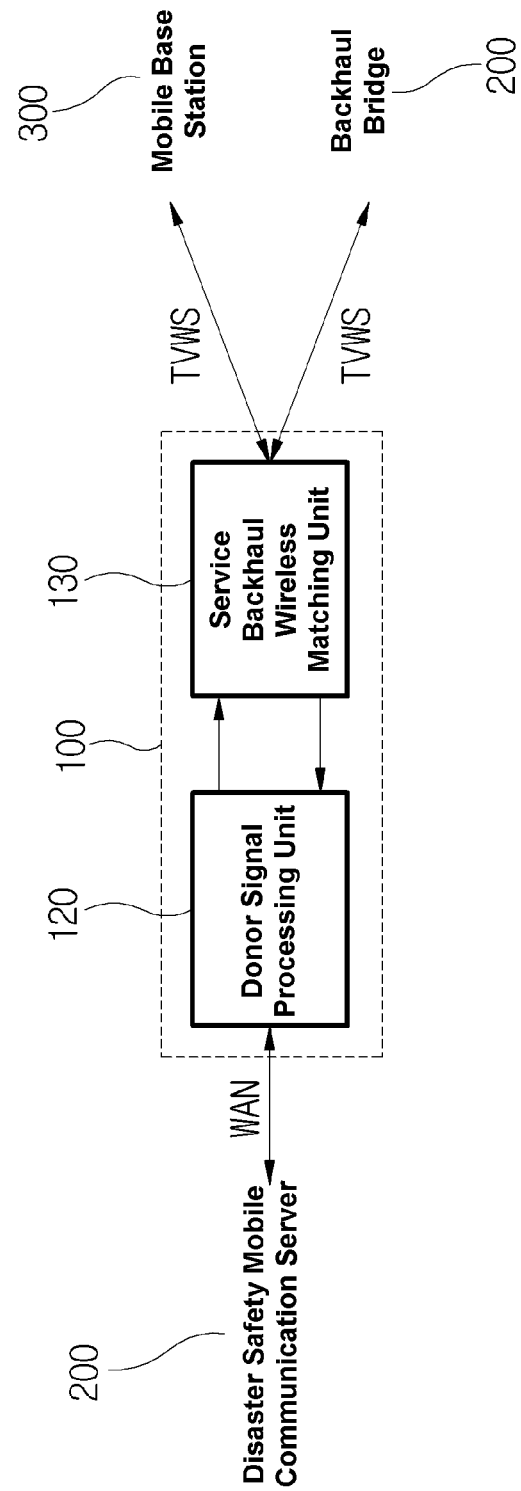
FIG. 5 is a configuration diagram illustrating a backhaul donor of FIG. 1 in detail.

FIG. 5 is a configuration diagram illustrating the backhaul donor 100 of FIG. 1 in detail.

Referring to FIG. 5, the backhaul donor 100 includes a donor signal processing unit 120 and a service backhaul wireless matching unit 130.

The donor signal processing unit 120 is connected to the disaster safety mobile communication server 500 through the WAN, and processes a signal of the backhaul donor 100. The service backhaul wireless matching unit 130 is connected to the donor signal processing unit 120, and wirelessly performs matching with any one of the mobile base station 300 and the backhaul bridge 200 through a TVWS.

The backhaul donor 100 connects signals of the mobile base station 300 and the backhaul bridge 200 to a wired network. Furthermore, the backhaul donor 100 may be connected to a TVWS DB server 520 based on location information of the backhaul bridge 200 and the mobile base station 300, and acquire a TVWS available channel.

The backhaul donor 100 may be formed in a backpack shape in consideration of portability. The backhaul donor 100 may be driven by a commercial power supply (AC 220V), a battery or an independent power supply unit.

The service backhaul wireless matching unit 130 may receive RF signals through two TVWS antennas, the RF signals being transmitted by the mobile base station 300 and the backhaul bridge 200 through the TVWS MIMO system. The received TVWS MIMO RF signals are demodulated into baseband signals through OFDM demodulation. The demodulated signals may be converted into packet data which can be transmitted to a TCP/IP network, and the packet data may be inputted to the donor signal processing unit 120. At this time, the MIMO system may separately use vertically and horizontally polarized waves of the TVWS band.

The packet data may be connected to the disaster safety mobile communication server 500 or the satellite, depending on a backhaul connection state.

Figure 6:
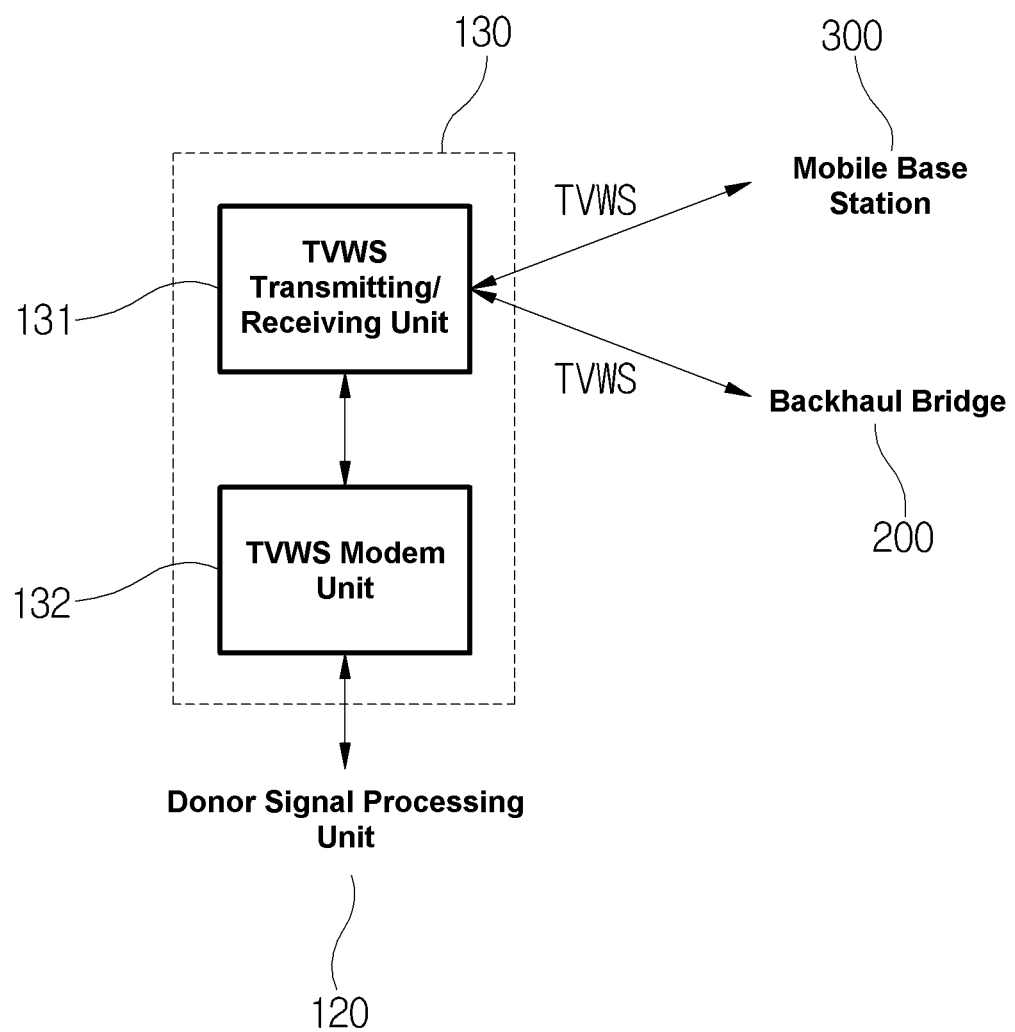
FIG. 6 is a configuration diagram illustrating a service backhaul wireless matching unit of FIG. 5 in detail.

FIG. 6 is a configuration diagram illustrating the service backhaul wireless matching unit 130 of FIG. 5 in detail.

Referring to FIG. 6, the service backhaul wireless matching unit 130 includes a TVWS transmitting/receiving unit 131 and a TVWS modem unit 132.

The TVWS transmitting/receiving unit 131 converts a signal of the TVWS modem unit 132 into a TVWS frequency signal or reversely converts a TVWS frequency signal, and wirelessly transmits/receives a TVWS frequency signal to/from any one of the mobile base station 300 and the backhaul bridge 200. The TVWS modem unit 132 modulates or demodulates a signal of the donor signal processing unit 120. That is, TVWS MIMO RF signals received from the mobile base station 300 and the backhaul bridge 200 may be received through two TVWS antennas of the TVWS transmitting/receiving unit 131. The received TVWS MIMO RF signals are demodulated into baseband signals by the TVWS modem unit 132. The demodulated signals may be converted into TCP/IP packet data, and inputted to the donor signal processing unit 120.

At this time, the TVWS modem unit 132 OFDM-demodulates an analog I/Q signal, and converts the demodulated signal into TCP/IP packet data. Then, the TVWS modem unit 132 may transmit the TCP/IP packet data to the donor signal processing unit 120.

Also, the TVWS modem unit 132 OFDM-modulates TCP/IP packet data transmitted from the donor signal processing unit 120, and converts the modulated data into an analog I/Q signal. Then, the TVWS modem unit 132 may transmit the analog I/Q signal to the mobile base station 300 or the backhaul bridge 200 through the TVWS transmitting/receiving unit 311.

The TVWS transmitting/receiving unit 131 may include an LNA for low-noise amplifying a TVWS MIMO signal and an HPA for amplifying a TVWS MIMO signal to high power. The TVWS transmitting/receiving unit 131 may include an RF switch for switching between operations of transmitting and receiving an RF signal.

Figure 7:
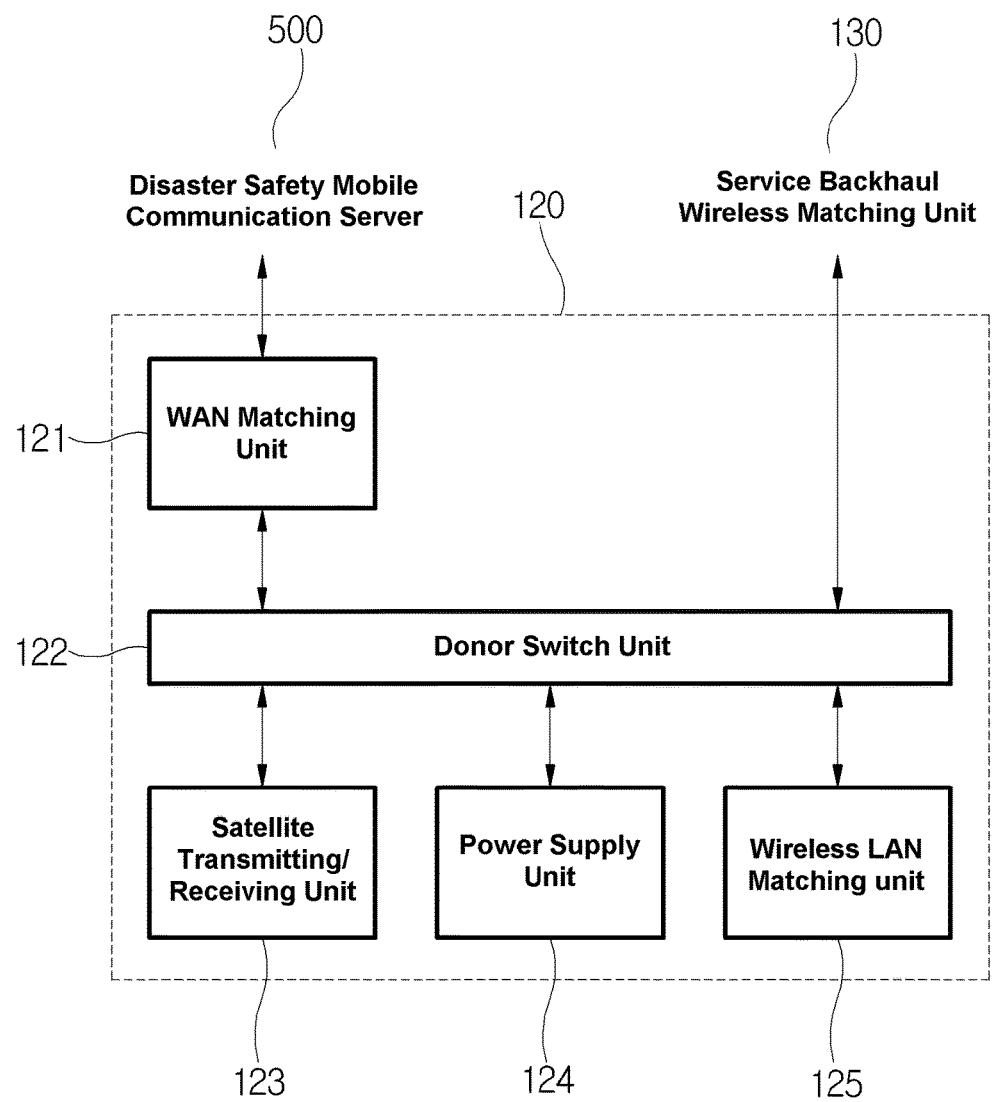
FIG. 7 is a configuration diagram illustrating a donor signal processing unit of FIG. 5 in detail.

FIG. 7 is a configuration diagram illustrating the donor signal processing unit 120 of FIG. 5 in detail.

Referring to FIG. 7, the donor signal processing unit 120 includes one or more of a WAN matching unit 121, a donor switch unit 122, a satellite transmitting/receiving unit 123, a power supply unit 124 and a wireless LAN matching unit 125.

The WAN matching unit 121 performs matching with the disaster safety mobile communication server 500 through the WAN. The donor switch unit 122 switches signals of the WAN matching unit 121 and the service backhaul wireless matching unit 130. The satellite transmitting/receiving unit 123 wirelessly transmits/receives a signal to/from a satellite. The power supply unit 124 supplies power to the backhaul donor 100. The wireless LAN matching unit 125 matches a wireless LAN signal.

For example, a signal received from the service backhaul wireless matching unit 130 and a wireless LAN signal received from the wireless LAN matching unit 125 may be inputted to the donor switch unit 122, and transmitted to the satellite through the satellite transmitting/receiving unit 123 according to the backhaul setting.

For another example, a signal received from the service backhaul wireless matching unit 130 and a wireless LAN signal received from the wireless LAN matching unit 125 may be inputted to the donor switch unit 122, and transmitted to the disaster safety mobile communication server 500 through the WAN matching unit 121 according to the backhaul setting.

Furthermore, a signal transmitted from the disaster safety mobile communication server 500 or the satellite transmitting/receiving unit 123 may be retransmitted to the service backhaul wireless matching unit 130. Also, the signal transmitted from the disaster safety mobile communication server 500 or the satellite transmitting/receiving unit 123 may be retransmitted to the wireless LAN matching unit 125.

The satellite transmitting/receiving unit 123 may be used for acquiring location information of the backhaul donor 100, and the location information may be acquired through a GPS antenna and receiver.

The power supply unit 124 may include a commercial power supply (AC 200V) or an independent power supply unit, and can be charged by a battery.

The donor switch unit 122 may include a user interface, and an LCD and key pad may be applied as the user interface. Through the user interface, the state of the backhaul donor 100 may be monitored and controlled.

Figure 8:
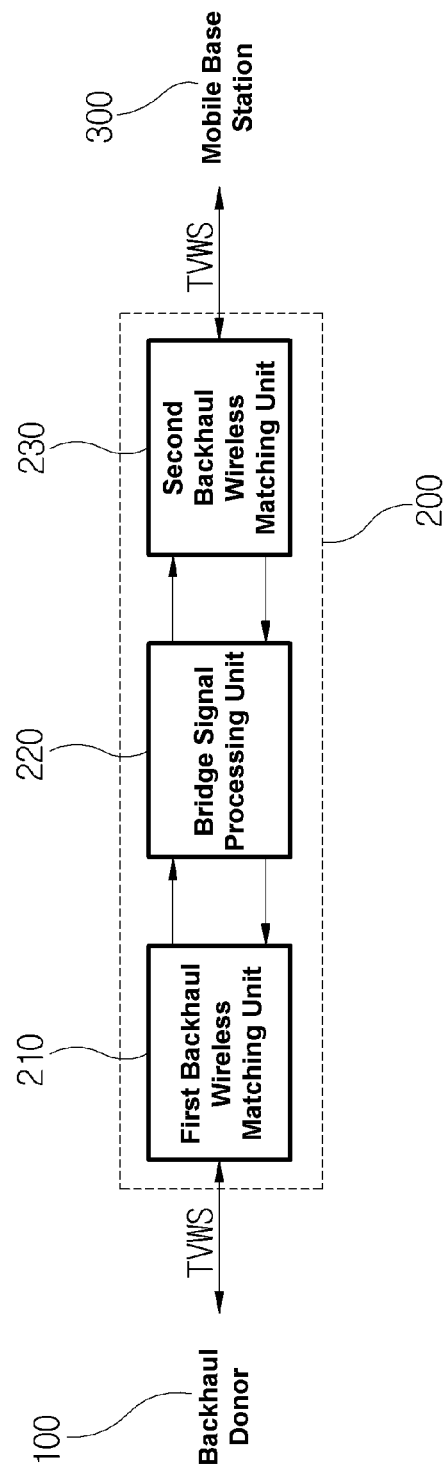
FIG. 8 is a configuration diagram illustrating a backhaul bridge of FIG. 1 in detail.

FIG. 8 is a configuration diagram illustrating the backhaul bridge 200 of FIG. 1 in detail.

Referring to FIG. 8, the backhaul bridge 200 includes a first backhaul wireless matching unit 210, a bridge signal processing unit 220 and a second backhaul wireless matching unit 230.

The first backhaul wireless matching unit 210 wirelessly performs matching with the backhaul donor 100 through a TVWS. The second backhaul wireless matching unit 230 wirelessly performs matching with the mobile base station 300 through a TVWS. The bridge signal processing unit 220 processes a signal of the backhaul bridge 200 between the first and second backhaul wireless matching units 210 and 230.

Furthermore, one or more backhaul bridges 200 may be successively used to connect the backhaul donor 100 and the mobile base station 300.

In order to expand the service distance of the backhaul donor 100, one or more backhaul bridges 200 can be successively used. The backhaul bridge 200 may demodulate a TVWS signal into a digital signal, re-modulate the digital signal to the TVWS signal, and then transmit the TVWS signal to the TVWS. Furthermore, the backhaul bridge 200 may be formed in a backpack shape in consideration of portability. The backhaul bridge 200 may be driven by a commercial power supply (AC 220V), a battery or an independent power supply unit.

The second backhaul wireless matching unit 230 may receive RF signals through two TVWS antennas, the RF signals being transmitted by the mobile base station 300 through the TVWS MIMO system. The received TVWS MIMO RF signals are OFDM-demodulated into baseband signals. The demodulated signals may be converted into packet data which can be transmitted to a TCP/IP network, and the packet data may be inputted to the bridge signal processing unit 220.

The packet data may be connected to an RF backhaul or satellite depending on a backhaul connection state. When the packet data are to be transmitted to the RF backhaul, the packet data may be inputted to the first backhaul wireless matching unit 210, and modulated to TVWS MIMO OFDM signals in the 6 MHz band. At this time, the MIMO system may separately use vertically and horizontally polarized waves in the TVWS band.

The modulated TVWS MIMO signals may be converted into signals in the 470-698 MHz band, and then radiated to the backhaul donor 100 through two TVWS antennas.

Figure 9:
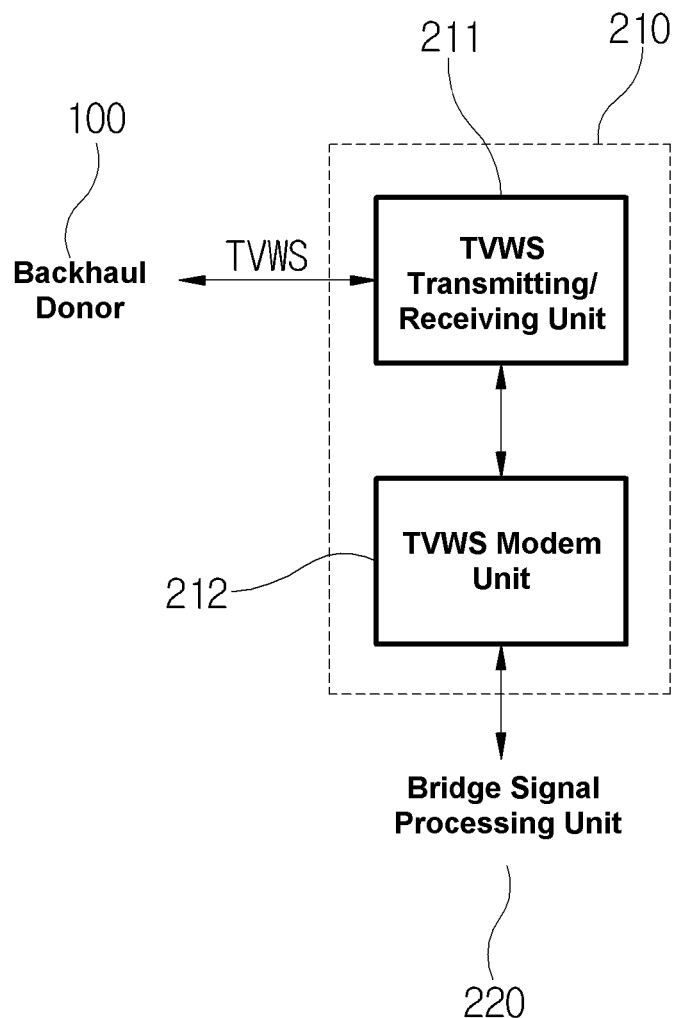
FIG. 9 is a configuration diagram illustrating a first backhaul wireless matching unit of FIG. 8 in detail.

FIG. 9 is a configuration diagram illustrating the first backhaul wireless matching unit 210 of FIG. 8 in detail.

Referring to FIG. 9, the first backhaul wireless matching unit 210 includes a TVWS transmitting/receiving unit 211 and a TVWS modem unit 212.

The TVWS transmitting/receiving unit 211 converts a signal of the TVWS modem unit 212 into a TVWS frequency signal or reversely converts a TVWS frequency signal, and wirelessly transmits/receives a signal to/from the backhaul donor 100. The TVWS modem unit 212 modulates and demodulates a signal of the bridge signal processing unit 220.

That is, the TVWS MIMO RF signals transmitted from the backhaul donor 100 may be received through two TVWS antennas of the TVWS transmitting/receiving unit 211. The received TVWS MIMO RF signals are demodulated into baseband signals by the TVWS modem unit 212. The demodulated signals may be converted into TCP/IP packet data, and inputted to the bridge signal processing unit 220.

At this time, the TVWS modem unit 212 OFDM-demodulates an analog I/Q signal, and converts the demodulated signal into TCP/IP packet data. Then, the TVWS modem unit 212 may transmit the TCP/IP packet data to the bridge signal processing unit 220.

Also, the TVWS modem unit 212 OFDM-modulates TCP/IP packet data transmitted from the bridge signal processing unit 220, and converts the modulated data into an analog I/Q signal. Then, the TVWS modem unit 212 may transmit the analog I/Q signal to the backhaul donor 100 through the TVWS transmitting/receiving unit 211.

The TVWS transmitting/receiving unit 211 may include an LNA for low-noise amplifying the TVWS MIMO signal and an HPA for amplifying the TVWS MIMO signal to high power. The TVWS transmitting/receiving unit 211 may include an RF switch for switching between operations of transmitting and receiving an RF signal.

Figure 10:
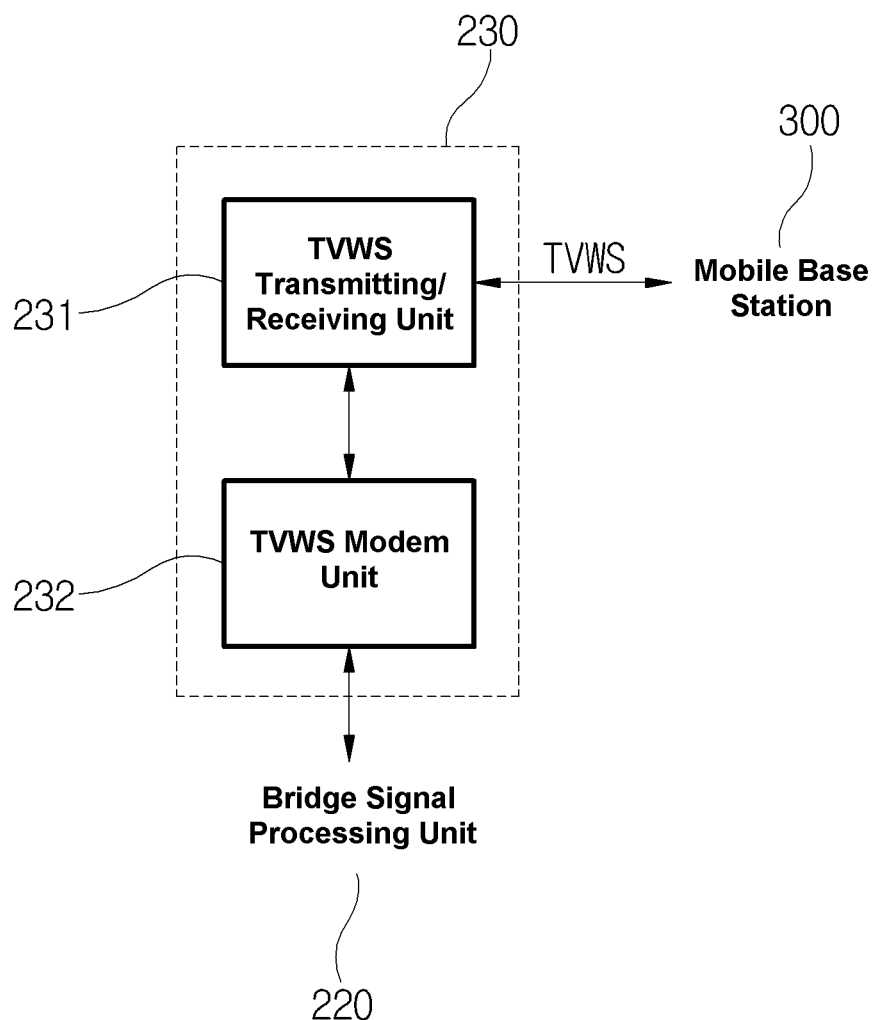
FIG. 10 is a configuration diagram illustrating a second backhaul wireless matching unit of FIG. 8 in detail.

FIG. 10 is a configuration diagram illustrating the second backhaul wireless matching unit 230 of FIG. 8 in detail.

Referring to FIG. 10, the second backhaul wireless matching unit 230 includes a TVWS transmitting/receiving unit 231 and a TVWS modem unit 232.

The TVWS transmitting/receiving unit 231 converts a signal of the TVWS modem unit 232 into a TVWS frequency signal or reversely converts a TVWS frequency signal, and wirelessly transmits/receives a signal to/from the mobile base station 300. The TVWS modem unit 232 modulates and demodulates a signal of the bridge signal processing unit 220.

That is, the TVWS MIMO RF signals transmitted from the mobile base station 300 may be received through two TVWS antennas of the TVWS transmitting/receiving unit 231. The received TVWS MIMO RF signals are demodulated into baseband signals by the TVWS modem unit 232. The demodulated signals may be converted into TCP/IP packet data, and inputted to the bridge signal processing unit 220.

At this time, the TVWS modem unit 232 OFDM-demodulates an analog I/Q signal, and converts the demodulated signal into TCP/IP packet data. Then, the TVWS modem unit 232 may transmit the TCP/IP packet data to the bridge signal processing unit 220.

Also, the TVWS modem unit 232 OFDM-modulates TCP/IP packet data transmitted from the bridge signal processing unit 220, and converts the modulated data into an analog I/Q signal. Then, the TVWS modem unit 232 may transmit the analog I/Q signal to the mobile base station 300 through the TVWS transmitting/receiving unit 231.

The TVWS transmitting/receiving unit 231 may include an LNA for low-noise amplifying the TVWS MIMO signal and an HPA for amplifying the TVWS MIMO signal to high power. The TVWS transmitting/receiving unit 231 may further include an RF switch for switching between operations of transmitting and receiving an RF signal.

Figure 11:
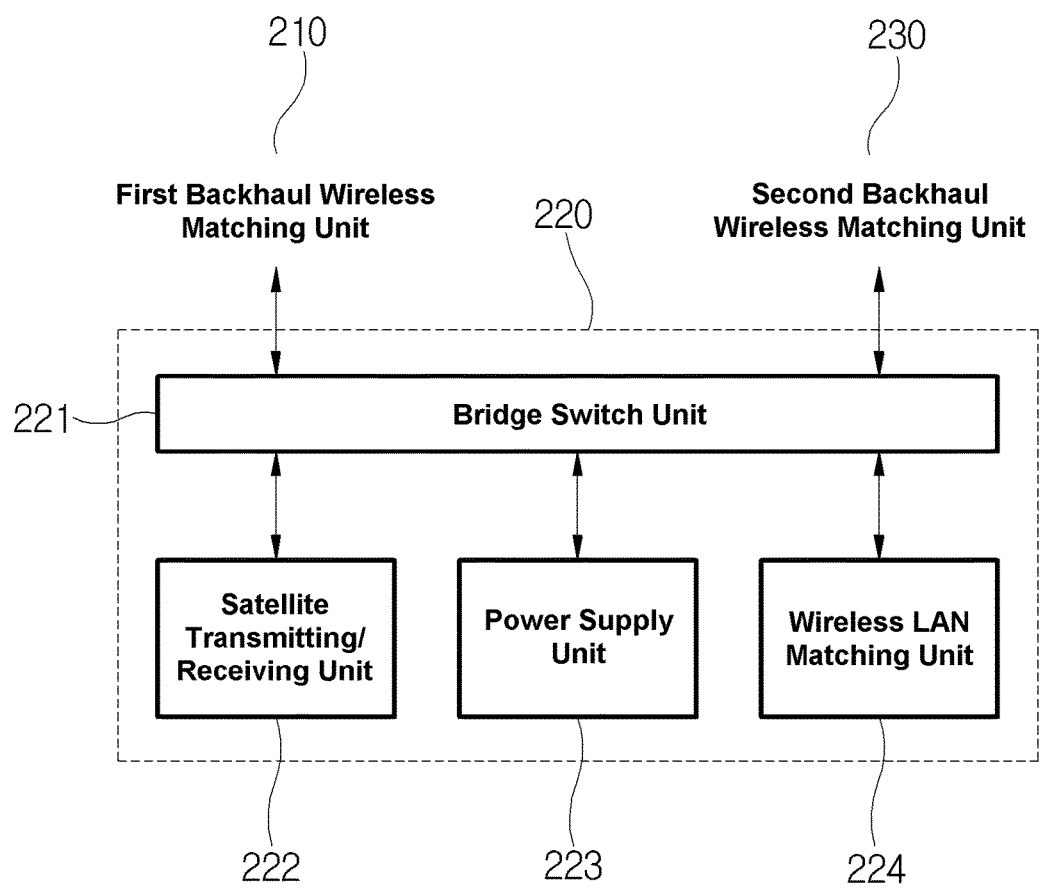
FIG. 11 is a configuration diagram illustrating a bridge signal processing unit of FIG. 8 in detail.

FIG. 11 is a configuration diagram illustrating the bridge signal processing unit 220 of FIG. 8 in detail.

Referring to FIG. 11, the bridge signal processing unit 220 includes one or more of a bridge switch unit 221, a satellite transmitting/receiving unit 222, a power supply unit 223 and a wireless LAN matching unit 224.

The bridge switch unit 221 switches signals of the first and second backhaul wireless matching units 210 and 230. The satellite transmitting/receiving unit 222 wirelessly transmits/receives a signal to/from a satellite. The power supply unit 223 supplies power to the backhaul bridge 200. The wireless LAN matching unit 224 matches a wireless LAN signal.

For example, a signal received from the second backhaul wireless matching unit 230 and a wireless LAN signal received from the wireless LAN matching unit 224 may be inputted to the bridge switch unit 221, and transmitted to the satellite through the satellite transmitting/receiving unit 222 according to the backhaul setting.

For another example, the signal received from the second backhaul wireless matching unit 230 and the wireless LAN signal received from the wireless LAN matching unit 224 may be inputted to the bridge switch unit 221, and transmitted to the backhaul donor 100 through the first backhaul wireless matching unit 210 according to the backhaul setting.

Furthermore, a signal transmitted from the first backhaul wireless matching unit 210 or the satellite transmitting/receiving unit 222 may be retransmitted to the second backhaul wireless matching unit 230. Also, the signal transmitted from the first backhaul wireless matching unit 210 or the satellite transmitting/receiving unit 222 may be retransmitted to the wireless LAN matching unit 224.

The satellite transmitting/receiving unit 222 may also be used for acquiring location information of the backhaul bridge 200, and the location information may be acquired through a GPS antenna and receiver.

The power supply unit 223 may include a commercial power supply (AC 200V) or an independent power supply device, and can be charged by a battery.

The bridge switch unit 221 may include a user interface, and an LCD and keypad may be applied as the user interface. Through this user interface, the state of the backhaul bridge 200 may be monitored and controlled.

Figure 12:
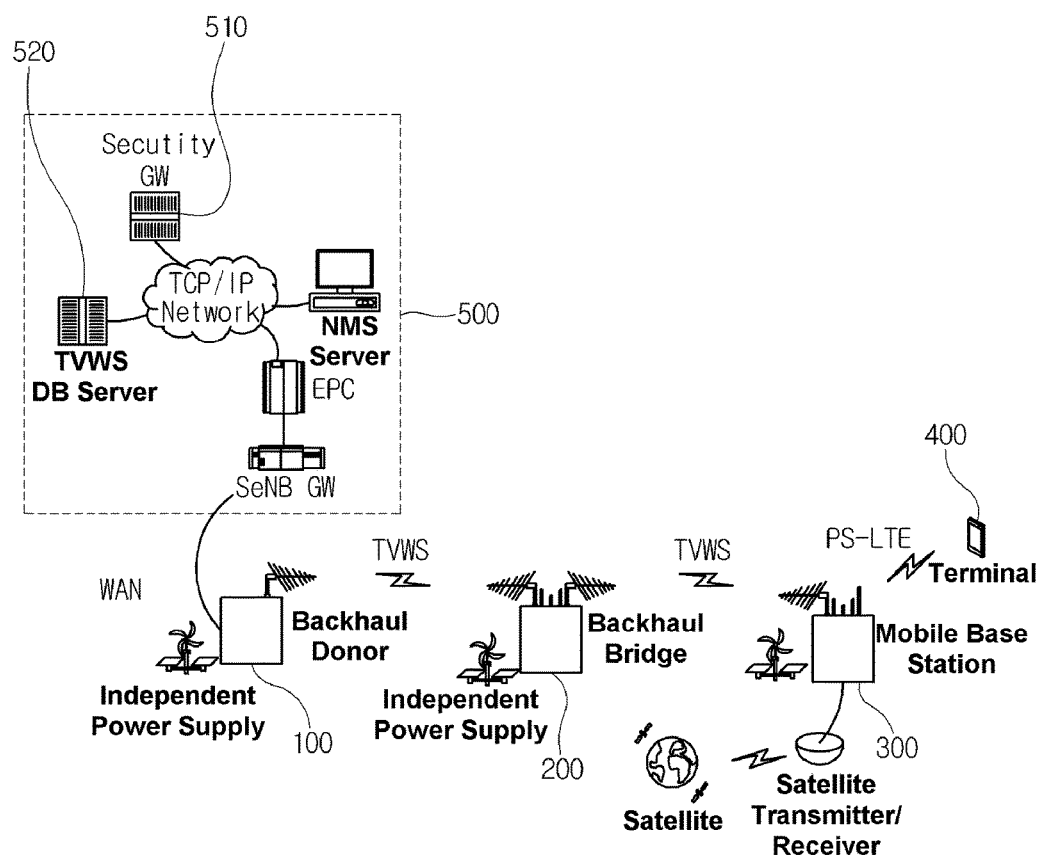
FIG. 12 is a connection diagram illustrating a network in which the backhaul donor, the backhaul bridge, the mobile base station and the terminal of FIG. 1 are connected to each other.

FIG. 12 is a connection diagram illustrating a network in which the backhaul donor 100, the backhaul bridge 200, the mobile base station 300 and the terminal 400 in FIG. 1 are connected to each other.

Referring to FIG. 12, each of the backhaul donor 100, the backhaul bridge 200 and the mobile base station 300 may have a structure that can be carried through a backpack. At this time, the backhaul donor 100, the backhaul bridge 200 and the mobile base station 300 may receive power from at least one of a commercial power supply, a battery, sunlight, wind power and power generation equipment.

The backhaul donor 100, the backhaul bridge 200 and the mobile base station 300 may include a MIMO system to increase the transmission rate of a wireless backhaul. At this time, the MIMO system may separately use vertically and horizontally polarized waves in a range of sight, and change the angle of an omni-directional antenna by 90 degrees, in order to use the antenna.

The disaster safety mobile communication server 500 may include a security gateway 510 for solving a security problem on the network.

The backhaul donor 100 is used for connecting a TVWS wireless network signal to a wired network. Furthermore, the backhaul donor 100 may be connected to the TVWS DB server 520 based on location information of TVWS devices, and acquire a TVWS available channel.

The backhaul donor 100 may be formed in a backpack shape in consideration of portability, and driven by a commercial power supply (AC 200V), a battery or an independent power supply unit (sunlight, wind power or power generation equipment).

Since the backhaul donor 100 is used in a backpack type, a disaster recovery worker can carry the backhaul donor 100 on his back and easily install the backhaul donor 100 even in an area where a vehicle access is not allowed due to a disaster such as a broken road.

Furthermore, when an event is suddenly held in a small area, a small-scale disaster occurs, or a traffic overload is detected in a macro base station, the mobile base station 300 may be immediately installed to construct a micro cell. Through this operation, an emergency disaster mobile communication service can be provided to induce traffic distribution.

The backhaul bridge 200 may be used for expanding the communication service distance of the backhaul donor 100. The backhaul bridge 200 may demodulate a TVWS signal into a digital signal, re-modulate the digital signal to the TVWS signal, and then transmit the TVWS signal to the TVWS. The backhaul bridge 200 may be driven by a commercial power supply (AC 220V), a battery or an independent power supply unit.

The mobile base station 300 may be connected to a TCP/IP network through a satellite and RF backhaul, while transmitting/receiving a signal to/from the terminal through PS-LTE in the 700 MHz band. The mobile base station 300 may have a battery embedded therein, and receive power from an independent power supply (sunlight, wind power or power generator) besides a commercial power supply (AC 200V).

The backhaul donor 100, the backhaul bridge 200 and the mobile base station 300 may transmit/receive MIMO signals in the 6 MHz or 12 MHz band through the TVWS, and perform communication at a data rate of 35 to 40 Mbps.

The mobile base station 300 may be directly connected to the backhaul donor 100 through the TVWS. When the quality of wireless communication between the backhaul donor 100 and the mobile base station 300 is degraded, the backhaul bridge 200 may be used to raise the quality of the wireless communication.

The number of backhaul bridges 200 is not limited, and different input and output frequencies may be used in order to block an input/output interference between the backhaul bridges 200.

The disaster safety mobile communication server 500 may monitor and control the states of the backhaul donor 100, the backhaul bridge 200 and the mobile base station 300, in order to maintain the backhaul donor 100, the backhaul bridge 200 and the mobile base station 300.

The disaster safety mobile communication server 500 can solve a network security problem of the backhaul donor 100, the backhaul bridge 200 and the mobile base station 300, using the security gateway 510.

Figure 13:
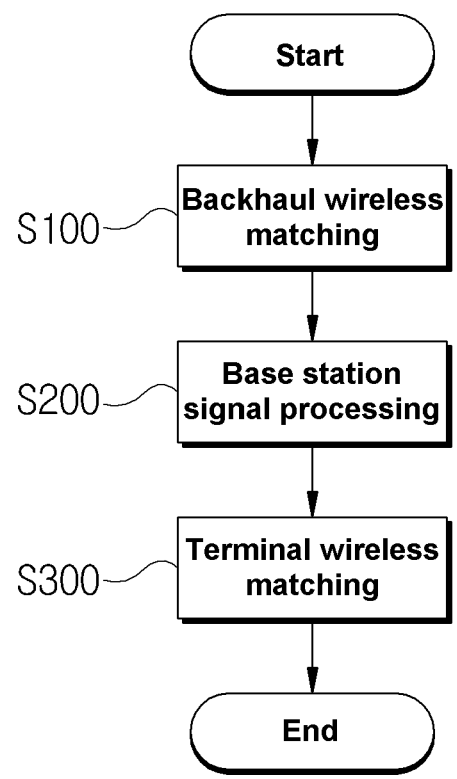
FIG. 13 illustrates a backpack-type mobile base station method based on a TVWS and satellite backhaul according to an embodiment of the present invention.

FIG. 13 illustrates a backpack-type mobile base station method based on a TVWS and satellite backhaul according to an embodiment of the present invention. Referring to FIG. 13, the backpack-type mobile base station method based on a TVWS and satellite backhaul will be described.

The mobile base station 300 performs wireless matching with any one of the backhaul donor 100 and the backhaul bridge 200 through a TVWS at step S100.

For example, in the backhaul wireless matching step S100, the mobile base station 300 may receive a TVWS wireless network signal transmitted from the backhaul donor 100 or the backhaul bridge 200, and use the backhaul. In some cases, the mobile base station 300 may receive a signal from a satellite and perform matching.

Then, the mobile base station 300 process an output of the backhaul wireless matching step S100 to a signal for performing matching with the terminal 400. That is, a base station signal processing step S200 is performed.

For example, in the base station signal processing step S200, the mobile base station 300 may select any one of the signal received from the backhaul donor 100 and the signal received from the satellite, and wirelessly transmit the selected signal to the terminal 400 or transmit the selected signal through a wireless LAN.

For another example, the mobile base station 300 may select any one of the signal received from the backhaul bridge 200 and the signal received from the satellite, and wirelessly transmit the selected signal to the terminal 400 or transmit the selected signal through a wireless LAN.

Then, the mobile base station 300 wirelessly performs matching with the terminal 400. That is, a terminal wireless matching step S300 is performed.

In the terminal wireless matching step S300, the mobile base station 300 may wirelessly perform matching with the terminal 400 using a PS-LTE wireless frequency, and wirelessly perform matching with the terminal 400 through a wireless LAN. At this time, the backhaul donor 100, the backhaul bridge 200 and the mobile base station 300 may transmit/receive MIMO signals in the 6 MHz or 12 MHz band through the TVWS, and perform communication at a data rate of 35 to 40 Mbps.

The mobile base station 300 may be directly connected to the backhaul donor 100 through the TVWS. When the quality of wireless communication between the backhaul donor 100 and the mobile base station 300 is degraded, the backhaul bridge 200 may be used to raise the quality of the wireless communication.

The number of backhaul bridges 200 is not limited, and different input and output frequencies may be used in order to block an input/output interference between the backhaul bridges 200.

The backpack-type mobile base station system and method based on a TVWS and satellite backhaul according to the embodiments of the present invention can provide a disaster and safety mobile communication service using a TVWS as a backhaul. Since a mobile base station providing a disaster safety mobile communication service can communicate with a maintenance server using the TVWS as a backhaul, the mobile base station can be easily carried and constructed. Therefore, the backpack-type mobile base station system and method can remove a small-scale shadow area, prevent a traffic overload in an emergency disaster area, and allow a disaster recovery worker to recover an emergency disaster safety network in an area where a vehicle access is not allowed due to a broken road or the like.

The functions described in one or more exemplary embodiments may be embodied in hardware, software, firmware or arbitrary combinations thereof. When the functions are embodied in software, the functions may be stored or transmitted as one or more commands or codes into a computer readable medium. The computer readable medium may include arbitrary media such as communication media and computer storage media, through which a computer program can be easily transferred from one place to another place.

The storage medium may include an arbitrary available medium which can be accessed by a computer. For example, the computer readable medium may include an optical disk drive such as RAM, ROM, EEPROM or CD-ROM, a magnetic disk drive, another magnetic storage device, or another arbitrary medium which can be used for transmitting or storing a desired program code as a command or data and accessed by a computer. Furthermore, an arbitrary connection may be properly designated as a computer readable medium.

When the functions are embodied in software, the techniques described herein may be embodied into modules for performing the functions (for example, procedures and functions). The software codes may be stored in memory units, and executed by processors. The memory units may be implemented in the processors or implemented outside the processors. In this case, the memory units can be connected to the processors through various means.

When the functions are embodied in hardware, processing units may be implemented by one or more application-specific integrated circuits (ASIC), digital signal processors (DSP), digital signal processing devices (DSPD), programmable logic devices (PLD), field-programmable gate arrays (FPGA), processors, controllers, microcontrollers, microprocessors, other electronic units designed to perform the functions described herein, or combinations thereof.

Since the present invention can be embodied into other specific forms without changing the technical idea or necessary components thereof, it is obvious to those skilled in the art to which the present invention pertains that the above-described embodiments are only examples in terms of all aspects. The scope of the present invention may be designated by the following claims rather than the detailed description, and all changes or modifications derived from the meanings and scope of the claims and equivalents may be included in the scope of the present invention.

The above-described embodiments may include one or more actual examples. It is obvious to those skilled in the art that all available combinations of components or methods are not described in order to describe the above-described embodiments, but many additional combinations and substitutes for various embodiments can be made. Therefore, the above-described embodiments may include all substitutes, modifications and amendments within the scope of claims attached herein. For the range of the term "include or comprise" used in the detailed descriptions and claims, the term may be analyzed as a similar meaning to "consist of", as the term "consist of" is used as a transitional term in clams.

The invention claimed is:

1. A backpack-type mobile base station system based on a TVWS (Television White Space) and satellite backhaul, comprising a mobile base station configured to wirelessly perform matching with any one of a backhaul donor and a backhaul bridge through a TVWS, and provide an emergency disaster mobile communication service to a terminal,
wherein the mobile base station comprises:
a backhaul wireless matching unit configured to wirelessly perform matching with any one of the backhaul donor and the backhaul bridge through the TVWS;
a terminal wireless matching unit configured to wirelessly perform matching with the terminal; and
a base station signal processing unit configured to process a signal of the mobile base station between the backhaul wireless matching unit and the terminal wireless matching unit,
wherein the backhaul donor, the backhaul bridge and the mobile base station receive power from any one of a commercial power supply, a battery, sunlight, wind power, and a power generator.

2. The backpack-type mobile base station system of claim 1, wherein the backhaul wireless matching unit comprises:
a TVWS modem unit configured to modulate and demodulate a signal of the base station signal processing unit; and
a TVWS transmitting/receiving unit configured to convert a signal of the TVWS modem unit into a TVWS frequency signal or reversely convert the TVWS frequency signal, and wirelessly transmit/receive the TVWS frequency signal to/from any one of the backhaul donor and the backhaul bridge.

3. The backpack-type mobile base station system of claim 1, wherein the terminal wireless matching unit comprises:
a mobile communication modem unit configured to modulate and demodulate a signal of the base station signal processing unit; and
a mobile communication RF transmitting/receiving unit configured to convert a signal of the mobile communication modem unit into an RF frequency signal or reversely convert the RF frequency signal, and wirelessly transmit/receive the RF frequency signal to/from the terminal.

4. The backpack-type mobile base station system of claim 1, wherein the base station signal processing unit comprises one or more:
a base station switch unit configured to switch signals of the backhaul wireless matching unit and the terminal wireless matching unit;
a satellite transmitting/receiving unit configured to wirelessly transmit/receive a signal to/from the satellite;
a power supply unit configured to supply power to the mobile base station; and
a wireless LAN matching unit configured to match a wireless LAN signal.

5. The backpack-type mobile base station system of claim 1, wherein the backhaul donor comprises:
a donor signal processing unit connected to a disaster safety mobile communication server through a WAN, and configured to process a signal of the backhaul donor; and
a service backhaul wireless matching unit connected to the donor signal processing unit, and configured to wirelessly perform matching with any one of the mobile base station and the backhaul bridge through a TVWS.

6. The backpack-type mobile base station system of claim 5, wherein the service backhaul wireless matching unit comprises:
a TVWS modem unit configured to modulate and demodulate a signal of the donor signal processing unit; and
a TVWS transmitting/receiving unit configured to convert a signal of the TVWS modem unit into a TVWS frequency signal or reversely convert the TVWS frequency signal, and wirelessly transmit/receive the TVWS frequency signal to/from any one of the mobile base station and the backhaul bridge.

7. The backpack-type mobile base station system of claim 5, wherein the donor signal processing unit comprises one or more:
a WAN matching unit configured to perform matching with the disaster safety mobile communication server through the WAN;
a donor switch unit configured to switch signals of the WAN matching unit and the service backhaul wireless matching unit;
a satellite transmitting/receiving unit configured to wirelessly transmit/receive a signal to/from the satellite;
a power supply unit configured to supply power to the backhaul donor; and
a wireless LAN matching unit configured to match a wireless LAN signal.

8. The backpack-type mobile base station system of claim 5, wherein the disaster safety mobile communication server comprises a security gateway for solving a security problem on a network.

9. The backpack-type mobile base station system of claim 1, wherein the backhaul bridge comprises:
a first backhaul wireless matching unit configured to wirelessly perform matching with the backhaul donor through a TVWS;
a second backhaul wireless matching unit configured to wirelessly perform matching with the mobile base station through a TVWS; and
a bridge signal processing unit configured to process a signal of the backhaul bridge between the first and second backhaul wireless matching units.

10. The backpack-type mobile base station system of claim 9, wherein the first backhaul wireless matching unit comprises:
a TVWS modem unit configured to modulate and demodulate a signal of the bridge signal processing unit into a baseband signal; and
a TVWS transmitting/receiving unit configured to convert a signal of the TVWS modem unit into a TVWS frequency signal or reversely convert the TVWS frequency signal, and wirelessly transmit/receive the TVWS frequency signal to/from the backhaul donor.

11. The backpack-type mobile base station system of claim 9, wherein the second backhaul wireless matching unit comprises:
a TVWS modem unit configured to modulate and demodulate a signal of the bridge signal processing unit; and
a TVWS transmitting/receiving unit configured to convert a signal of the TVWS modem unit into a TVWS frequency signal or reversely convert the TVWS frequency signal, and wirelessly transmit/receive the TVWS frequency signal to/from the mobile base station.

12. The backpack-type mobile base station system of claim 1, wherein one or more backhaul bridges are successively used to connect the backhaul donor and the mobile base station.

13. The backpack-type mobile base station system of claim 1, wherein the bridge signal processing unit comprises:
- a bridge switch unit configured to switch signals of the first and second backhaul wireless matching unit;
- a satellite transmitting/receiving unit configured to wirelessly transmit/receive a signal to/from the satellite;
- a power supply unit configured to supply power to the backhaul bridge; and
- a wireless LAN matching unit configured to match a wireless LAN signal.

14. The backpack-type mobile base station system of claim 1, wherein the backhaul donor, the backhaul bridge and the mobile base station comprises a structure which is carried through a backpack.

15. The backpack-type mobile base station system of claim 1, wherein the backhaul donor, the backhaul bridge and the mobile base station comprises a MIMO (Multi Input Multi Output) system to raise the transmission rate of a wireless backhaul.

16. The backpack-type mobile base station system of claim 15, wherein the MIMO system separately uses vertically and horizontally polarized waves within a range of sight, and changes the angle of an omni-directional antenna by 90 degrees in order to use the antenna.

17. A backpack-type mobile base station method based on a TVWS and satellite backhaul, comprising:
- a backhaul wireless matching step of wirelessly performing matching with any one of a backhaul donor and a backhaul bridge through a TVWS;
- a base station signal processing step of processing an output of the backhaul wireless matching step into a signal for performing matching with a terminal; and
- a terminal wireless matching step of wirelessly performing matching with the terminal,
- wherein in the backhaul wireless matching step, the backhaul donor and the backhaul bridge receives power from at least one of a commercial power supply, a battery, sunlight, wind power and a power generator.

\* \* \* \* \*